United States Patent
Fetterman et al.

(10) Patent No.: US 12,066,567 B2
(45) Date of Patent: *Aug. 20, 2024

(54) APPARATUS AND METHOD FOR DETECTING RADAR SENSOR BLOCKAGE USING MACHINE LEARNING

(71) Applicant: Arriver Software LLC, Novi, MI (US)

(72) Inventors: Matthew Fetterman, Waltham, MA (US); Jifeng Ru, Concord, MA (US); Aret Carlsen, Groton, MA (US); Yifan Zuo, Lowell, MA (US)

(73) Assignee: Arriver Software LLC, Novi, MI (US)

( * ) Notice: Subject to any disclaimer, the term of this patent is extended or adjusted under 35 U.S.C. 154(b) by 201 days.

This patent is subject to a terminal disclaimer.

(21) Appl. No.: 17/670,015

(22) Filed: Feb. 11, 2022

(65) Prior Publication Data

US 2022/0163631 A1 May 26, 2022

Related U.S. Application Data

(63) Continuation of application No. 16/257,817, filed on Jan. 25, 2019, now Pat. No. 11,280,883.

(51) Int. Cl.
*G01S 7/40* (2006.01)
*G01S 7/41* (2006.01)
*G06N 20/00* (2019.01)

(52) U.S. Cl.
CPC ............... *G01S 7/40* (2013.01); *G01S 7/417* (2013.01); *G06N 20/00* (2019.01); *G01S 7/4039* (2021.05)

(58) Field of Classification Search
CPC .......... G01S 7/40; G01S 7/417; G01S 7/4039; G01S 13/87; G01S 2013/9323;
(Continued)

(56) References Cited

U.S. PATENT DOCUMENTS 6,771,207 B1    8/2004  Lang
7,973,701 B2 *  7/2011  Lohmeier ............. G01S 13/931
                                                       342/147

(Continued)

FOREIGN PATENT DOCUMENTS

CN    108027421 A    5/2018
DE      4223346 A1   1/1994
(Continued)

OTHER PUBLICATIONS

International Search Report and Written Opinion for International Application No. PCT/US2019/065675 dated Feb. 28, 2020.

*Primary Examiner* — Olumide Ajibade Akonai
(74) *Attorney, Agent, or Firm* — Arriver Software LLC

(57) ABSTRACT

A radar sensor includes a memory storing a model defining a relationship between a condition of the radar sensor and a plurality of features of radar detections, the model being generated by a machine learning approach and storing values of the plurality of features associated with the known states of the condition of the radar sensor. A radar detector transmits radar signals into a region, detects reflected returning radar signals from the region, and converts the reflected returning radar signals into digital data signals. A processor receives the digital data signals and processes the digital data signals to generate actual radar detections, each characterized by a plurality of the features of radar detections. The processor applies values of the features of the actual radar detections to the model to determine the state of the condition of the radar sensor.

14 Claims, 11 Drawing Sheets

(58) Field of Classification Search
CPC . G01S 2013/93271; G01S 2013/93272; G01S 2013/93274; G01S 7/4026; G01S 7/412; G01S 13/931; G01S 13/89; G01S 17/931; G01S 2013/9315; G06N 20/00; G06N 3/08; G06V 10/82; G06V 10/764; G05D 1/0257; G06T 2207/10044; G06F 30/27
See application file for complete search history.

(56) References Cited

U.S. PATENT DOCUMENTS

| | | | |
|---|---|---|---|
| 11,280,883 B2* | 3/2022 | Fetterman | G01S 7/4026 |
| 2009/0243912 A1 | 10/2009 | Lohmeier et al. | |
| 2015/0309165 A1 | 10/2015 | Elwart | |
| 2016/0320471 A1 | 11/2016 | Preussner | |
| 2017/0059695 A1 | 3/2017 | Fetterman | |
| 2017/0269196 A1 | 9/2017 | Millar et al. | |
| 2018/0024569 A1 | 1/2018 | Branson | |
| 2018/0143299 A1 | 5/2018 | Chabaud | |
| 2018/0285319 A1 | 10/2018 | Nieuwenhuys | |
| 2018/0301002 A1 | 10/2018 | Turcott | |
| 2019/0025404 A1 | 1/2019 | Farmer | |
| 2019/0072646 A1 | 3/2019 | Zeleny | |
| 2019/0385025 A1 | 12/2019 | McMichael | |
| 2020/0097767 A1 | 3/2020 | Perry | |
| 2020/0134358 A1 | 4/2020 | She | |
| 2020/0175332 A1 | 6/2020 | Karlinsky | |
| 2020/0210887 A1 | 7/2020 | Jain | |

FOREIGN PATENT DOCUMENTS

| | | |
|---|---|---|
| DE | 102005059902 A1 | 6/2007 |
| DE | 102017108348 B3 | 6/2018 |
| DE | 102017211816 A1 | 1/2019 |
| EP | 3290946 A1 | 8/2019 |
| KR | 20180133745 A | 12/2018 |

* cited by examiner

FilteredEnergy
TotalDetections
AvgClutterRange
AvgCorr_deg
AzimCorrCurve_deg
CyclesGood_pct
GathDist_m
AvgErr_deg
BinsReady
MinAngleErr_deg
RV_Progress
LVDR_HighSNRIndex
EngyRngEst_EstimatedRange_m
ualityMgr_SsmLevel
CafDetect_range_m
AS-Inliers
AS_Mag_mps
AS_X_mps
AS_Y_mps
CurrNumInliers
CurrVelErr
EgoVel_mps
OldTrgsUsed
TrgsMapped
MinCorr_deg
AzimErr_prog
Azim_Err_resid
NumDetsColl
TrgProcessed
MaxClutterRange
EngyRngEst_Obscured

*Fig. 5A*

| Feature Name | Feature Meaning | Derived from | Decision |
|---|---|---|---|
| Filtered_Energy | Sum of energy from all detections within a measurement time window | Detections | Selected |
| TotalDetections | Total number of detections within a measurement time window | Detections | Selected |
| MaxClutterRange | the furthest detection distance in a measurement time window | Detections | Selected |
| AvgClutterRange | The average of all detected ranges within a measurement time window | Detections | Selected |
| MinAngleErr_deg | the minimum angle error. Every cycle, we estimate the alignment error. This variable will be the minimum estimated alignment error, since the car was turned on. | Alignment | Potentially accepted then ignored. Using output from alignment function is also problematic (as noted in the patent). |
| AzimCorrCurve_deg | the angle correction applied to detection azimeth. This variable will indicate the alignment error of the sensor, and would be 0 if the sensor is properly aligned. | Alignment | Potentially accepted then ignored. Using output from alignment function is also problematic (as noted in the patent). |
| Detect_ang_rad | The average detection angle | Detections | Potentially accepted then ignored |
| EgoVel_mps | the host velocity | Vehicle Dynamics | Potentially accepted then ignored |

*Fig. 5C*

APPARATUS AND METHOD FOR DETECTING RADAR SENSOR BLOCKAGE USING MACHINE LEARNING

CROSS REFERENCE TO RELATED APPLICATIONS

This application is a continuation of U.S. patent application Ser. No. 16/257,817, filed on Jan. 25, 2019, the entire contents of which are incorporated herein by reference.

BACKGROUND

1. Technical Field

The present disclosure is related to automotive detection systems such as automotive radar systems and, in particular, to an apparatus and method for detecting and correcting for blockage of an automotive radar sensor.

2. Discussion of Related Art

In automotive radar systems, it is desirable to detect when the radar sensor is blocked by debris, such as dirt, snow, ice, etc. Sensor blockage or radar blockage attenuates the transmitted and received signal such that objects in the field of view are no longer detectable. It is also important to alert the driver when the sensor is blocked so that the driver does not rely on the radar system while a sensor is blocked, and so that the driver can intervene and clear the debris from the sensor to restore performance of the system.

Declaring a sensor blockage based on the absence of radar signal processing detections is a relatively straightforward means of determining sensor blockage with minimal additional processing time or resources. One drawback of this approach is that it is difficult to distinguish the blocked case from the case in which there are relatively few or no objects large enough to create detections in the field of view of a sensor that is not blocked and is functioning properly. This situation can occur, for example, when the automobile in which the system is operating is passing through a desert or along a bridge or causeway surrounded by water.

SUMMARY

According to one aspect, a radar sensor is provided. The radar sensor includes a memory storing a model defining a relationship between a condition of the radar sensor and a plurality of features of radar detections, the model being generated by a machine learning approach in which, during a training operation, a plurality of training radar detections are received under known states of the condition of the radar sensor, the model storing values of the plurality of features associated with the known states of the condition of the radar sensor. The radar sensor further includes a radar detector for transmitting radar signals into a region, detecting reflected returning radar signals from the region, and converting the reflected returning radar signals into digital data signals. A processor receives the digital data signals and processes the digital data signals to generate actual radar detections, each of the actual radar detections being characterized by a plurality of the features of radar detections. The processor applies values of the features of the actual radar detections to the model to determine the state of the condition of the radar sensor from the values of the features of the actual radar detections.

In some exemplary embodiments, the radar system is an automotive radar system.

In some exemplary embodiments, the condition is blockage of the radar sensor. The state of the condition can be is blocked, partially blocked or unblocked.

In some exemplary embodiments, the machine learning approach comprises at least one of a neural network approach, a logistic regression approach and/or a bagged trees approach.

In some exemplary embodiments, the model identifies a subset of features associated with the training radar detections which are useful in determining the state of the condition of the radar sensor; and the processor applies the identified features of the actual radar detections to the model to determine the state of the condition of the radar sensor. The subset of features can be selected using analysis of histograms of features associated with the training radar detections. The subset of features can be selected using a bagged trees analysis of features associated with the training radar detections.

According to another aspect, a method for detecting a condition in a radar sensor is provided. The method includes: storing in a memory a model defining a relationship between the condition of the radar sensor and a plurality of features of radar detections, the model being generated by a machine learning approach in which, during a training operation, a plurality of training radar detections are received under known states of the condition of the radar sensor, the model storing values of the plurality of features associated with the known states of the condition of the radar sensor; transmitting radar signals into a region; detecting reflected returning radar signals from the region; converting the reflected returning radar signals into digital data signals; receiving the digital data signals with a processor; and processing the digital data signals with the processor to generate actual radar detections, each of the actual radar detections being characterized by a plurality of the features of radar detections, the processor applying values of the features of the actual radar detections to the model to determine the state of the condition of the radar sensor from the values of the features of the actual radar detections.

In some exemplary embodiments, the radar system is an automotive radar system.

In some exemplary embodiments, the condition is blockage of the radar sensor. The state of the condition can be is blocked, partially blocked or unblocked.

In some exemplary embodiments, the machine learning approach comprises at least one of a neural network approach, a logistic regression approach and/or a bagged trees approach.

In some exemplary embodiments, the model identifies a subset of features associated with the training radar detections which are useful in determining the state of the condition of the radar sensor; and the processor applies the identified features of the actual radar detections to the model to determine the state of the condition of the radar sensor. The subset of features can be selected using analysis of histograms of features associated with the training radar detections. The subset of features can be selected using a bagged trees analysis of features associated with the training radar detections.

BRIEF DESCRIPTION OF THE DRAWINGS

The present disclosure is further described in the detailed description which follows, in reference to the noted plurality of drawings by way of non-limiting examples of embodiments of the present disclosure, in which like reference numerals represent similar parts throughout the several views of the drawings.

FIG. 4B includes an exemplary histogram for a rejected feature with no correlation to blockage; and FIG. 4C includes an exemplary histogram for a potential feature with high correlation to blockage.

FIG. 5A includes a list of the 31 potential feature variables selected during the first stage of feature selection using histograms and subjected to the second stage of feature selection using the bagged trees process, according to some exemplary embodiments.

FIG. 5C includes a table which lists some of the feature variables processed by the two-stage feature selection process described in detail herein, as well as the disposition of each of the selected listed features, according to some exemplary embodiments.

DETAILED DESCRIPTION

Figure 1A:
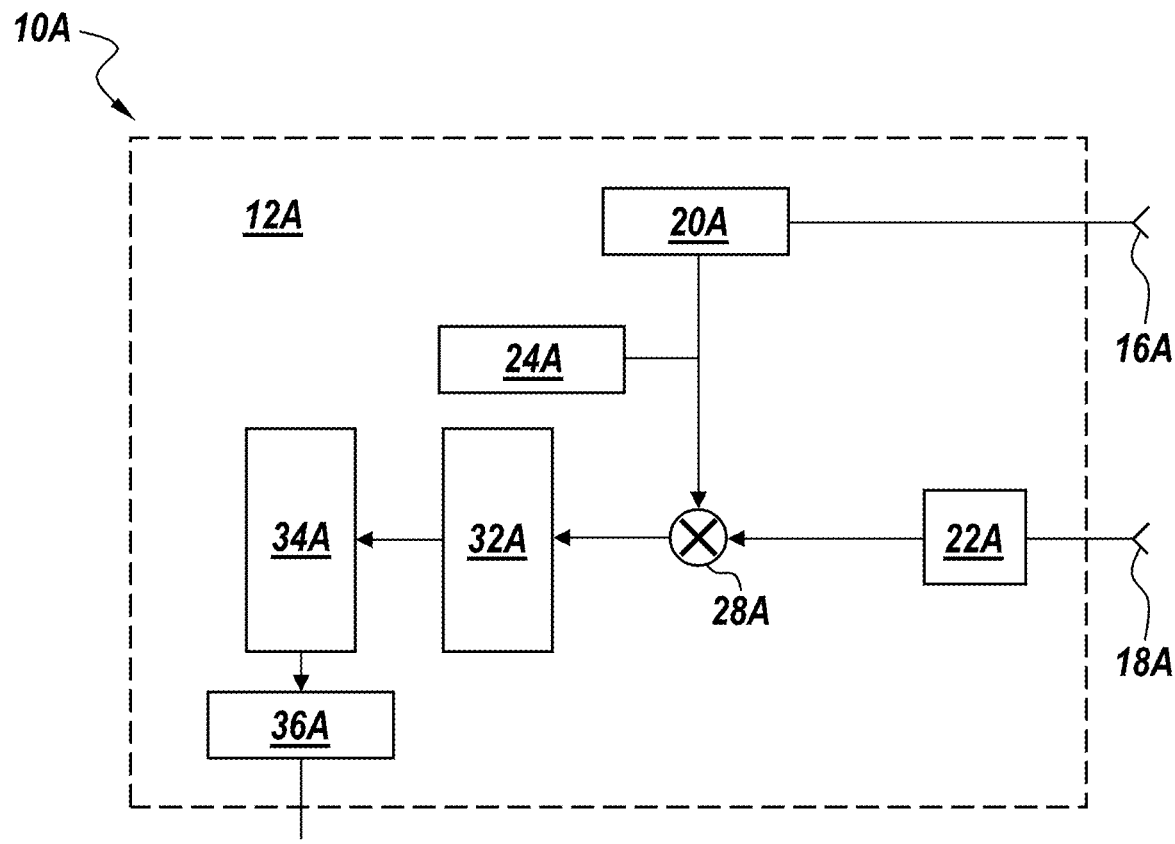
FIG. 1A includes a schematic block diagram of an automotive detection system, such as an automotive radar system, according to some exemplary embodiments.

FIG. 1A includes a schematic block diagram of an automotive detection system 10A, such as an automotive radar system, according to some exemplary embodiments. It is noted that, although the following detailed description refers to system 10A as an automotive radar system as an exemplary illustrative embodiment, the present disclosure is directed to automotive detection systems in general and can be, for example, automotive radar systems, automotive LiDAR systems, or other such detection systems. The description herein of radar system components and signal processing are applicable to analogous components and signal processing of LiDAR systems. Referring to FIG. 1A, system 10A includes one or more detection modules such as radar sensor modules 12A, which process radar transmit and receive signals which are compatible with the radar detection and monitoring system 10A in the host automobile. Radar sensor module 12A generates and transmits radar signals into the region adjacent to the host vehicle that is being monitored by system 10A. Generation and transmission of signals is accomplished by RF signal generator 24A, radar transmit circuitry 20A and transmit antenna 16A. Radar transmit circuitry 20A generally includes any circuitry required to generate the signals transmitted via transmit antenna 16A, such as pulse shaping/timing circuitry, transmit trigger circuitry, RF switch circuitry, or any other appropriate transmit circuitry used by radar system 10A.

Radar sensor module 12A also receives returning radar signals at radar receive circuitry 22A via receive antenna 18A. Radar receive circuitry 22A generally includes any circuitry required to process the signals received via receive antenna 18A, such as pulse shaping/timing circuitry, receive trigger circuitry, RF switch circuitry, or any other appropriate receive circuitry used by the radar system. The received radar signals are processed by radar receive circuitry 22A to generate processed receive signals, which are forwarded to a mixer 28A, which mixes the processed receive signals with an RF signal from RF signal generator 24A. The resulting difference signals may be further filtered as required by filtering circuitry 32A to generate baseband signals, which are digitized by analog-to-digital converter circuitry (ADC) 34A to generate receive signals. These digitized baseband receive signals are processed by a processor, such as a digital signal processor (DSP) 36A, to generate target object detections related to objects in the region being monitored by detection system 10A. In some exemplary embodiments, the DSP 36A can perform any and/or all of the processing tasks required to implement the sensor blockage detection described herein according to the exemplary embodiments.

Figure 1B:
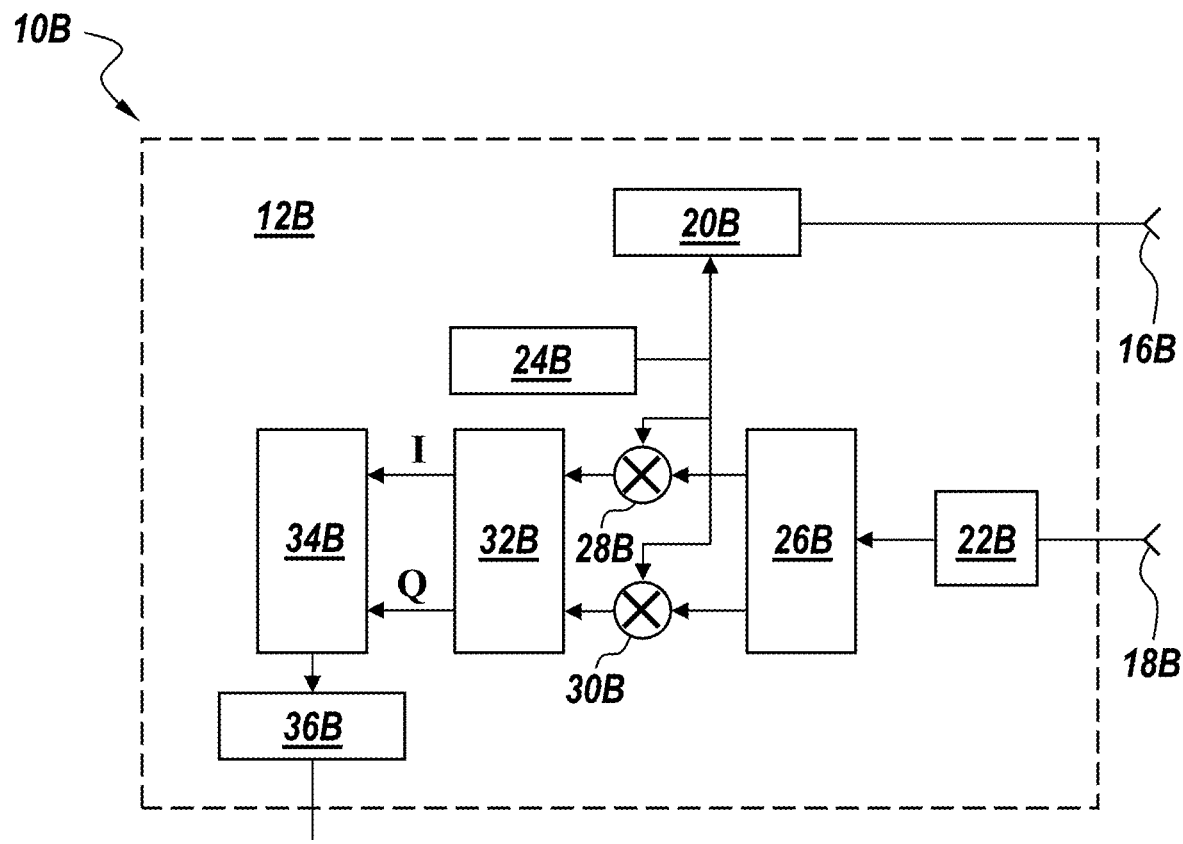
FIG. 1B includes a schematic block diagram of an alternative automotive detection system, such as an automotive radar system, according to some exemplary embodiments.

FIG. 1B includes a schematic block diagram of an alternative automotive detection system 10B, such as an automotive radar system, according to some exemplary embodiments. Referring to FIG. 1B, system 10B includes a radar sensor module 12B, which processes radar transmit and receive signals which are compatible with the radar detection and monitoring system in the host automobile. Radar sensor module 12B generates and transmits radar signals into the region adjacent to the host vehicle that is being monitored by the radar system. Generation and transmission of signals is accomplished by RF signal generator 24B, radar transmit circuitry 20B and transmit antenna 16B. Radar transmit circuitry 20B generally includes any circuitry required to generate the signals transmitted via transmit antenna 16B, such as pulse shaping circuitry, transmit trigger circuitry, RF switch circuitry, or any other appropriate transmit circuitry used by the radar system.

Radar sensor module 12B also receives returning radar signals at radar receive circuitry 22B via receive antenna 18B. Radar receive circuitry 22B generally includes any circuitry required to process the signals received via receive antenna 18B, such as pulse shaping circuitry, receive trigger circuitry, RF switch circuitry, or any other appropriate receive circuitry used by the radar system. In some exemplary embodiments, the received signals processed by radar receive circuitry 22B are forwarded to phase shifter circuitry 26B, which generates two signals having a predetermined phase difference. These two signals, referred to as an inphase (I) signal and a quadrature (Q) signal, are mixed with an RF signal from RF signal generator 24B by mixers 28B and 30B, respectively. The resulting difference signals are further filtered as required by filtering circuitry 32B to generate baseband I and Q signals, labeled "I" and "Q" in FIG. 1B.

The baseband I and Q signals are digitized by analog-to-digital converter circuitry (ADC) 34B. These digitized I and Q baseband signals are processed by a processor 36B, which can include such circuitry as a digital signal processor (DSP), associated memory, associated I/O circuitry, communication bus circuitry, and any other circuitry required for carrying out any processing functions of system 10B and/or radar sensor module 12B. In some exemplary embodiments, the DSP 36B can perform any and/or all of the processing tasks required to implement the sensor blockage detection described herein according to the exemplary embodiments.

In some exemplary embodiments, processor 36B can perform processing such as a fast Fourier Transform (FFT) to generate a plurality of Doppler range bins, which include range, bearing and velocity information for detections during multiple sweeps, i.e., frequency-modulated (FM) chirps, of the radar illumination signal transmitted into the region around the vehicle being analyzed. In some exemplary embodiments, radar sweeps are performed at a rate of approximately 12 Hz. It will be understood that other sweep rates can be used.

Figure 2:
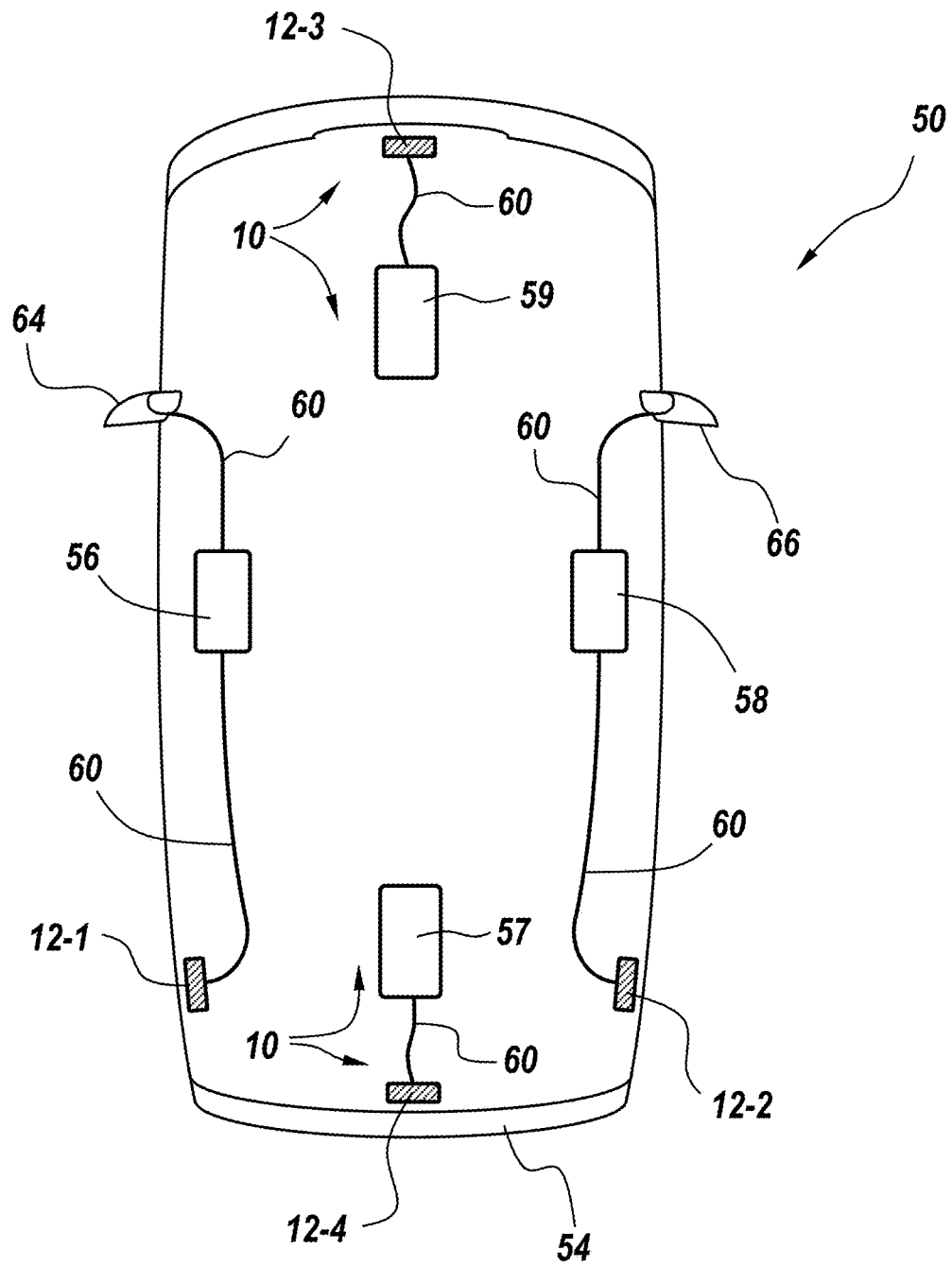
FIG. 2 includes a schematic top view of an automobile or vehicle equipped with an automotive detection system illustrated in FIGS. 1A and/or 1B, which includes one or more radar sensor modules, according to some exemplary embodiments.

FIG. 2 includes a schematic top view of an automobile or vehicle 50 equipped with an automotive detection system 10A, 10B illustrated in FIGS. 1A and/or 1B, respectively, and referred to herein collectively as automotive detection system 10, which includes one or more radar sensor modules 12A, 12B, referred to herein collectively as radar sensor modules 12, according to some exemplary embodiments. A first radar sensor module 12-1 can be connected via a bus 60, which in some exemplary embodiments is a standard automotive controller area network (CAN) bus, to a first CAN bus electronic control unit (ECU) 56. Object detections from radar sensor module 12-1 can be reported to ECU 56, which processes the detections and can provide detection alerts via CAN bus 60. In some exemplary embodiments, the alerts can be in the form of a visible indicator, such as a light-emitting diode (LED) in side mirror 64, which is visible to the driver. Similarly, in some exemplary embodiments, a second radar sensor module 12-2 can be connected via CAN bus 60, to a second CAN bus electronic control unit (ECU) 58. Object detections from radar sensor module 12-2 can be reported to ECU 58, which processes the detections and can provide detection alerts via CAN bus 60 to a visible indicator, such as a light-emitting diode (LED) in side mirror 66. In the particular embodiment illustrated in FIG. 2, first and second radar sensor modules 12-1 and 12-2 of radar system 10 can be part of a blind spot system for reporting object detections in one or both blind spots of automobile 50. It will be understood that the present disclosure is applicable to other types of radar systems 10. For example, in some exemplary embodiments, one or more forward-looking radar sensor modules 12-3 can be connected via CAN bus 60 to a third CAN bus electronic control unit (ECU) 59, and one or more rear-looking radar sensor modules 12-4 can be connected via CAN bus 60 to a fourth CAN bus electronic control unit (ECU) 57. ECUs 57 and 59 can process target object detections from radar sensor modules 12-3 and 12-4, respectively, and can provide detection alerts to a visible indicator or to a vehicle system process for appropriate processing and management of detections.

Referring to FIGS. 1A, 1B and 2, in summary, in some exemplary embodiments, raw ADC data is acquired and is processed to generate a list of detections, each of which can be associated with a plurality of features, as described herein in detail. Generating a list of detections can include, for example, generating range-Doppler (RD) maps of the region being examined. In some exemplary embodiments, these detections can be tracked. Also, the detections can be used as described herein in detail to detect sensor blockage and provide alerts of same. In addition to generating sensor blockage determinations, detections can also be used to monitor other performance/health indications, such as, for example, sensor alignment, sensor interference, and saturation, etc. As noted above, the associated processing can be performed by one or more processors 36A, 36B, and/or one or more ECUs 56, 57, 58, 59.

It will be understood that, according to the present disclosure, detection system 10 can have many configurations, each including different numbers and locations of sensor modules 12. For example, detection system 10 can include one or more forward-looking sensor modules 12, one or more rear-looking sensor modules 12, and/or one or more side-looking sensor modules 12. Data gathered by sensor modules 12 can be processed by one or more processors, e.g., ECUs, to carry out the various functions implemented by detection system 10. These functions can include, but are not limited to, at least one or any combination of any subset of: a blind spot detection feature, a rear cross traffic detection feature, a lane change assistance feature, a trailer detection feature, a safe door opening feature an adaptive cruise control function, an autonomous braking function, and the sensor blockage determination described herein in detail. Also, the one or more processors, e.g., ECUs, can perform any and/or all of the processing tasks required to implement the sensor blockage detection described herein according to the exemplary embodiments.

Figure 3:
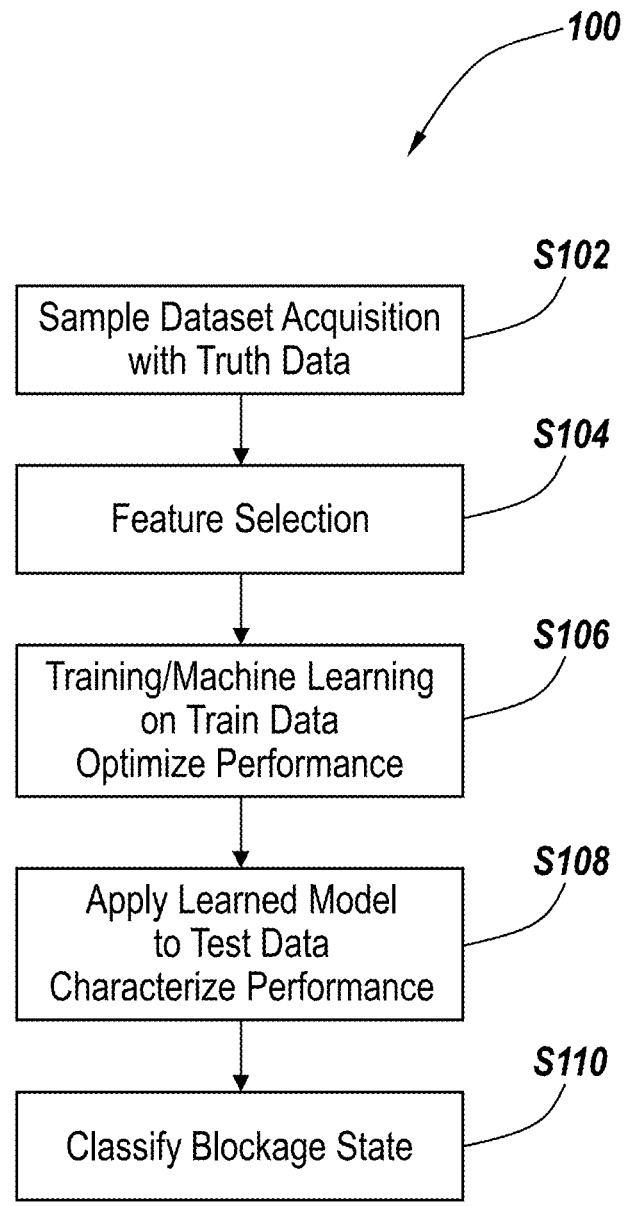
FIG. 3 includes a logical flow diagram illustrating steps in a process 100 for radar sensor blockage detection, according to some exemplary embodiments.

FIG. 3 includes a logical flow diagram illustrating steps in a process 100 for radar sensor blockage detection, according to some exemplary embodiments. Referring to FIG. 3, in step S102, a number of datasets are acquired using truth data, i.e., using known sensor blockage conditions, e.g., unblocked, 50% blocked, 80% blocked. Each dataset contains a time-dependent list of detections, as well as a list of sensor feature outputs. The sensor computes features based on detections, or other sensor inputs. As noted above, in some particular exemplary embodiments, the sensor may output 150 features or more. Next, in step S104, feature selection is performed, in which the sample detections are analyzed to determine a subset of features which are relatively highly correlated with sensor blockage and, therefore, are useful in the blockage state determination. As noted above, feature selection S104 can be completed to identify four features, e.g., number of detections, total detection energy, maximum detection range and average detection range. TotalDetections is the total number of detections received in the examined time window; FilteredEnergy, or total detection energy, is the sum of the energy from all detections in the examined time window; MaxClutterRange, or maximum detection range, is the furthest detection distance in the examined time window; and AvgClutterRange, or average detection range, is the distance averaged over all detections in the examined window. Other features can also be used. Following feature selection, training for machine learning S106 can be carried out on training data to optimize system performance and to generate the system model used for subsequent real-time blockage classification on actual test data. Supervised machine learning S106 is used to discover how to combine the selected features to determine whether the sensor is blocked. Next, after training and model creation S106 is completed, real-time operation in which sensor blockage determinations are made during sensor operational deployment is carried out. In step S108, the model generated in step S106 is applied to real-time test data acquisitions and performance is characterized, and their associated features are compared to the selected features used to detect blockage defined in the system model generated in S106. In step S110, the blockage state is classified. That is, if the combination of features is within a predetermined range for blockage, as determined by the system model generated during training/machine learning step S106, then it can be concluded in step S110 that the sensor is blocked.

According to the present disclosure, blockage of a radar sensor module is determined based on analysis of particular features of object detections which are determined to be closely correlated with the presence and/or absence of sensor blockage. A feature can be derived from detection data, track data, or other sensor parameters. A sensor could have hundreds of defined features. Most features are not related to sensor blockage, and, therefore, their presence or absence, or their nominal value, associated with a detection is of no help in determining whether the sensor may be blocked. Additionally, even though a feature may be relatively correlated with sensor blockage and may, therefore, have some value in a blockage determination, due to limitations on processing resources and/or processing time constraints, it is desirable to limit the number of features used in a blockage determination to only the most useful features, i.e., the features most closely correlated with sensor blockage.

By way of exemplary illustration, one of the features associated with object detections is sensor temperature. According to the present disclosure, it has been shown that temperature of the sensor is uncorrelated with sensor blockage. That is, it has been shown that there is little or no relationship between the temperature of the sensor and the blockage condition of the sensor. Stated more simply, it has been shown that temperature of the sensor has little to nothing to do with whether the sensor is blocked. Accordingly, sensor temperature is not a feature used in making the blockage determination of the present disclosure. On the other hand, number of detections has been found to be a very useful feature associated with sensor blockage. This logically follows since, if the number of detections were to start decreasing or drop to zero, under certain circumstances, that could be very closely correlated with a blockage situation. Accordingly, number of detections is a feature that is considered useful in generating a blockage determination.

As described above, the radar system generates a large number of output features, most of which are not relevant to the blockage issue, such as, for example, sensor temperature. In contrast, "useful" or "important" features are correlated with the blockage state. Processing of all features could be overly taxing of the processing and memory capabilities of the sensor. It may also be too time consuming to be useful. Therefore, according to the disclosure, the most useful features are selected in step S104 of FIG. 3 for blockage determination. In some exemplary embodiments, this involves selecting features of detections which are closely correlated with sensor blockage from among all of the available features of detections. In some exemplary embodiments, this feature selection process is carried out in multiple stages. In a first stage, in order to find useful features, each feature is represented using a histogram based on the data collected. Each histogram is analyzed such that each feature is labeled according to its level of "usefulness" to the blockage determination. A subset of features is then selected as "potentially selected." In a second stage of the feature selection process, a "Bagged Trees" process can be carried out to directly ascertain the importance of each "potentially selected" feature from the histogram analysis. Thus, for example, we might start with 150 features, and then the histogram would identify 31 features that are "potentially selected" and then the "Bagged Trees" process would identify four features that will be selected.

Regarding the first-stage histogram process, truth data is gathered under multiple sensor known blockage states for each feature to generate a histogram for each feature. The truth data is acquired in various environments when the radar sensor is truly clear or intentionally blocked. For each feature, the histogram associated with the feature is then used to evaluate the correlation of the feature with the blockage state. In generating the histogram for a feature from the truth data, multiple values for the feature can be generated for each of the predetermined blockage states. On one particular embodiment, three blockage states are used, and multiple feature values for each blockage state are generated and used to develop the histogram. In one embodiment, the three states are a "no block" or "clear" state, a 50% blocked state, and an 80% blocked state.

In some exemplary embodiments, to compile the truth data, ten hours of drive data were collected using a with an automotive radar system, such as that manufactured and sold by Applicant. Microwave foam was used to block the radar, the selected foam having two-way attenuation of 30 dB (radar range reduced to 42% of full range) or 15 dB (radar range reduced to 18% of full range). The truth data had three possibilities: unblocked, partially blocked (15 dB attenuation) and blocked (30 dB attenuation). Long drives were broken up into 15-second windows, so that all detections acquired during 15 seconds were combined into a structure representing one data point. The data were split into test and training datasets randomly, with 60% of the data used for training and 40% used for testing. The data were split so that data from any single drive was all put into the test or train datasets, instead of being divided between test and train datasets. This was done because data points from a single drive could be highly correlated, so that the test and training sets would not be independent observations.

According to the disclosure, each histogram is used to represent the distribution of feature data. In some exemplary embodiments, the total area of a histogram used for probability density is normalized to 1. In generating each histogram, the entire range of possible values for the associated feature is divided into a series of equal intervals or "bins". During the truth data gathering, the number of values that fall into each bin is counted. In the illustrative exemplary embodiments, the histograms for three cases, i.e., no block, 50% block and 80% block, are plotted for each feature variable. The histograms are then evaluated to determine the usefulness of the associated feature in the blockage determination. This evaluation can be performed by viewing the histograms and manually concluding usefulness. Alternatively, the evaluation can be performed mathematically, such as by a user or by a processor.

Figure 4A:
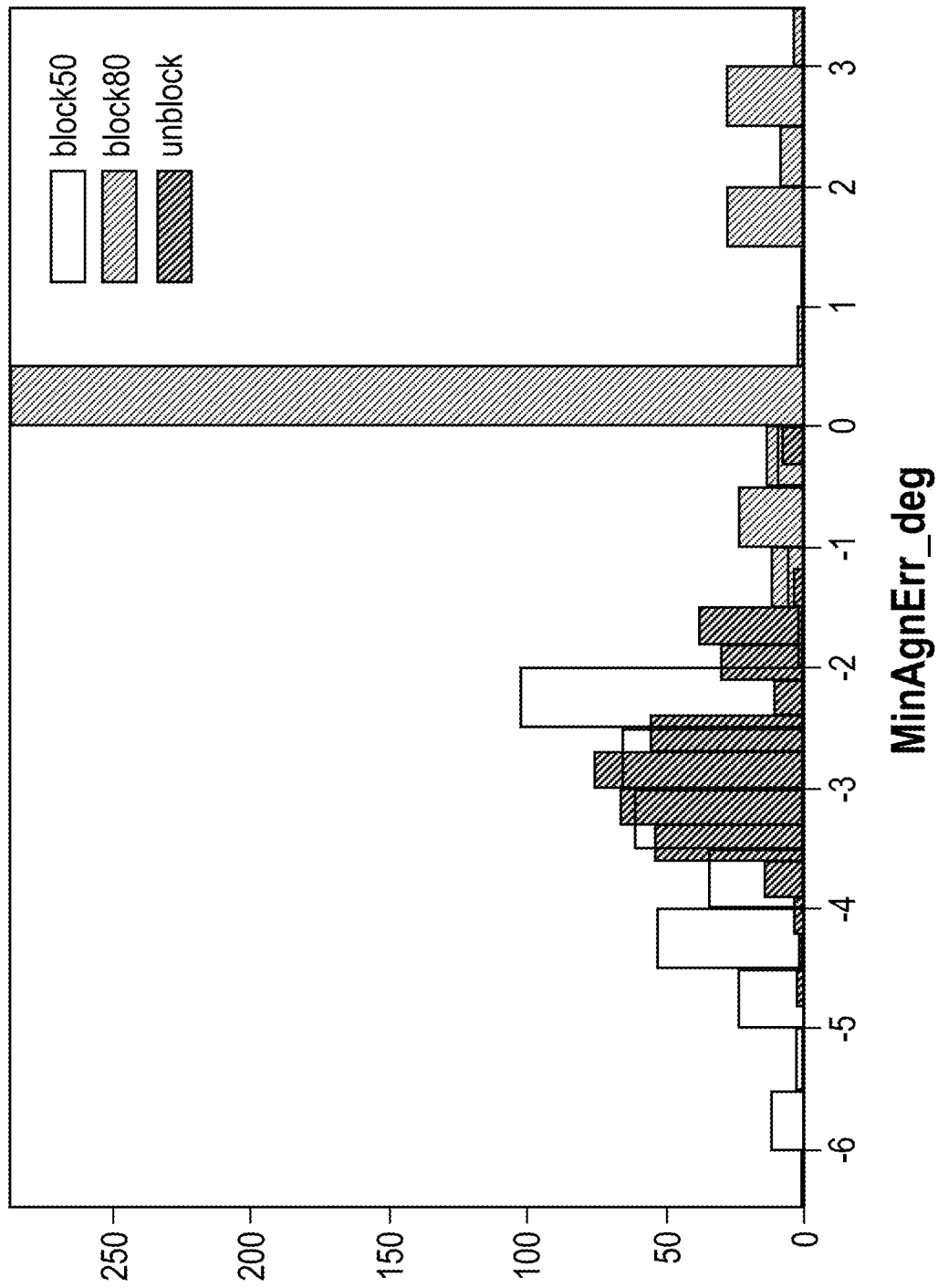
FIGS. 4A through 4C include exemplary histograms illustrating different degrees of usefulness in the blockage determination, according to some exemplary embodiments. Specifically, FIG. 4A includes an exemplary histogram for a potential feature with medium correlation to blockage.
Figure 4B:
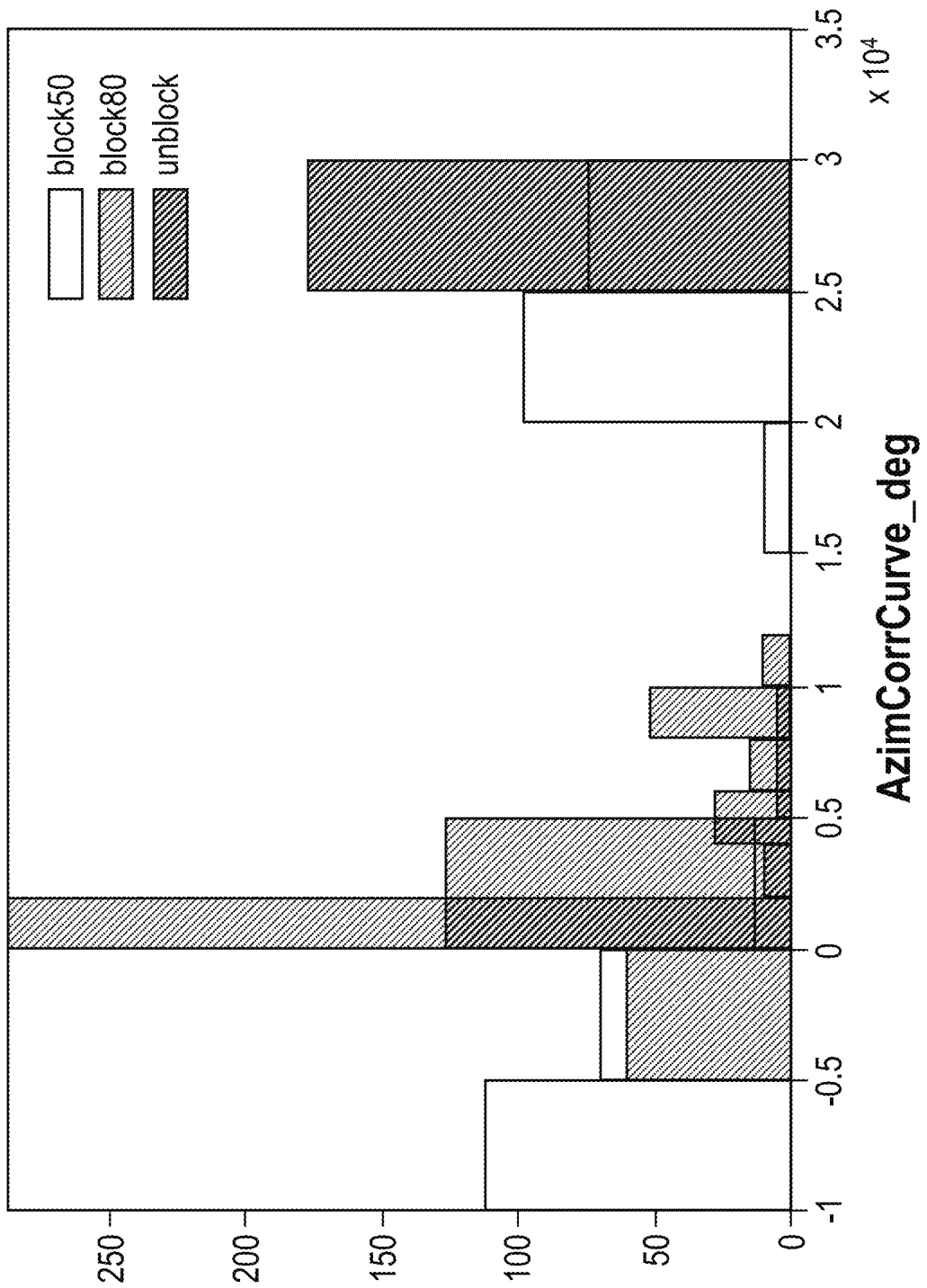
Figure 4C:
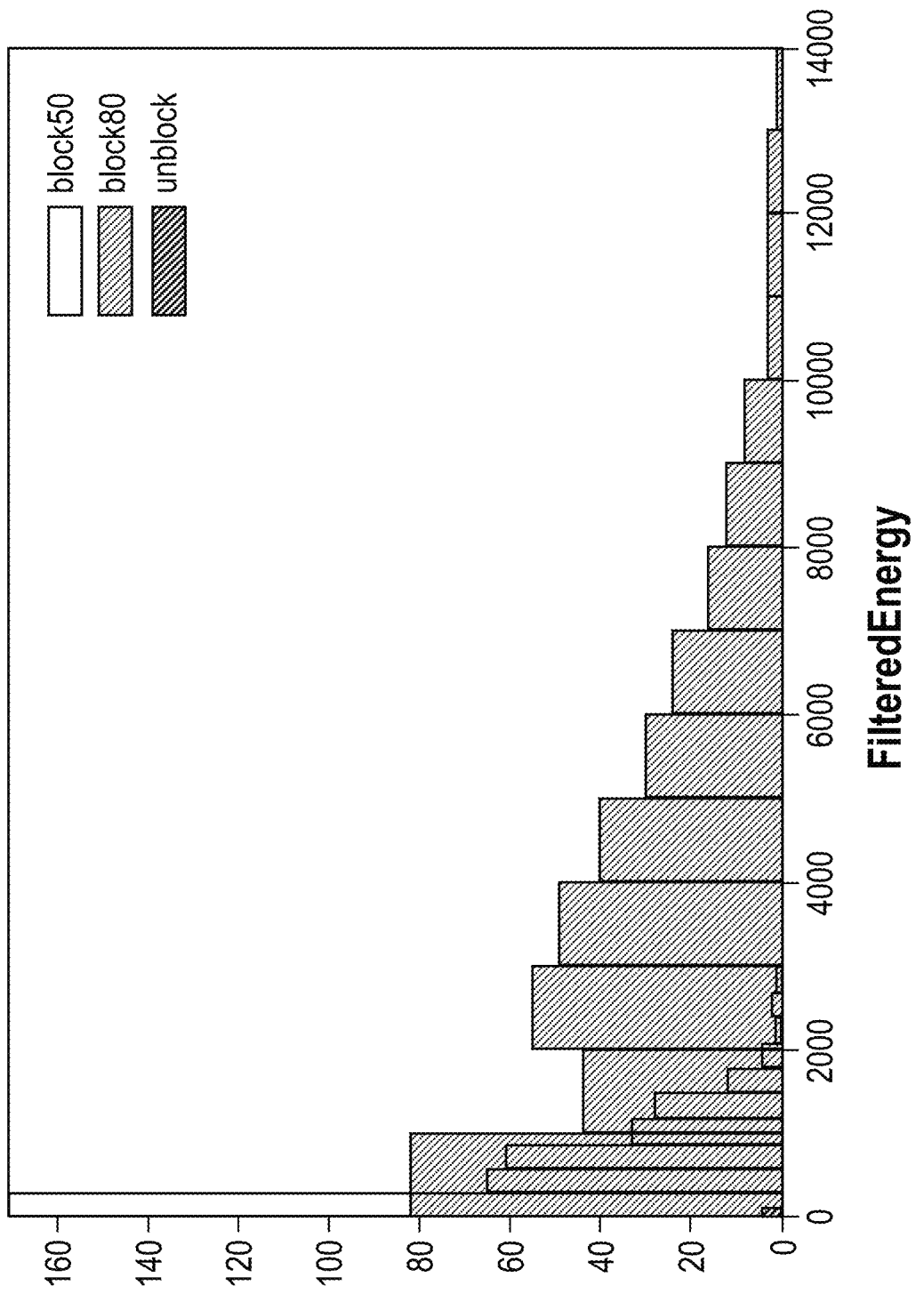

One observation related to usefulness and the histogram process is that the more spread the three density functions are over the full array of bins for feature values, the more useful the feature. FIGS. 4A through 4C include exemplary histograms illustrating different degrees of usefulness in the blockage determination, according to some exemplary embodiments. Specifically, FIG. 4A includes an exemplary histogram for a potential feature with medium correlation to blockage; FIG. 4B includes an exemplary histogram for a rejected feature with no correlation to blockage; and FIG. 4C includes an exemplary histogram for a potential feature with high correlation to blockage.

After the first-stage histogram process will follow the second-stage bagged-tree machine learning process. Under the bagged trees machine learning process, several comparatively smaller trees (models) are trained, instead of a complicated full decision tree. In training, random back sampling is used from the whole train sets to train a decision tree. Under random back sampling, sampled data is put back into the training data pool and could be re-sampled. In subsequent testing, data not selected in training is referred to as "out-of-bag" (OOB) data. OOB data is used to calculate the model error. In using the bagged trees process in connection with feature importance, the calculated error using OOB data for each tree in the testing stage is referred to as: $e_1, e_2, e_3, \ldots, e_N$, where N is the number of trees (models). For each tree, random noise is added to each feature of its OOB data, to then obtain the model error: $s_1, s_2, \ldots, s_N$. The importance factor of each feature is then computed as:

$$f = \frac{1}{N}\sum_{i=1}^{N}|e_i - s_i|.$$

One premise of this computation is that the more important a feature is, the more severe performance loss is when the feature is disregarded.

Referring to FIG. 4A, a histogram for the feature variable MinAngErr_deg is shown. This variable represents the minimum angle error in the detections. As illustrated in FIG. 4A, for this feature, the density functions are partially spread out over the horizontal axis. However, the density functions for unblocked data and 50% blocked data overlap. For example, for a variable value of –3.0 degrees, it is difficult or impossible to reliably conclude whether the sensor is unblocked or 50% blocked in this overlapped region. However, because the density function for 80% blocked is separate from the other two, data for 80% blocked state can readily be classified correctly. During this first-stage feature selection, this feature is still considered "potentially selected" since some classification can be obtained from this feature. As such, in some exemplary embodiments, this feature would be selected for further analysis during the second-stage bagged trees feature selection process.

Referring to FIG. 4B, a histogram for the feature variable AzimCorrCurve_deg is shown. This variable represents the angle correction applied to detection azimuth. As illustrated in FIG. 4B, for this feature, the density functions are mixed together across the range of values. As a result, such useless features are not selected since they will not help with the blockage classification.

Referring to FIG. 4C, a histogram for the feature variable FilteredEnergy is shown. This variable represents the total detection energy, which, as described above, is the sum of the energy from all detections in the examined time window in the detections. As illustrated in FIG. 4C, for this feature, the density functions are clearly spread in different regions. For example, referring to FIG. 4C, if a value of 2,000.00 for filtered energy is received, it is likely to be unblocked sensor data, with a very small probability to be 50% blocked data, and virtually zero probability of being 80% blocked data. The goal is to select features such as this useful feature to improve the accuracy of blockage classification.

According to one particular exemplary embodiment, a total of 31 potential features are identified by application of the analysis of the histograms for over 150 features. According to some exemplary embodiments, after this first-stage feature selection using histograms generated from truth data is performed, the set of "potentially selected" features, e.g., 31 features, then undergoes second-stage feature selection, using a machine learning process, such as, for example, the well-known bagged trees process. The bagged trees process is used to further down-select the features in consideration of computational cost, and possibly other factors. The bagged trees process is used to calculate each feature's importance in the blockage determination and, therefore, is helpful in down-selecting the features.

Figure 5B:
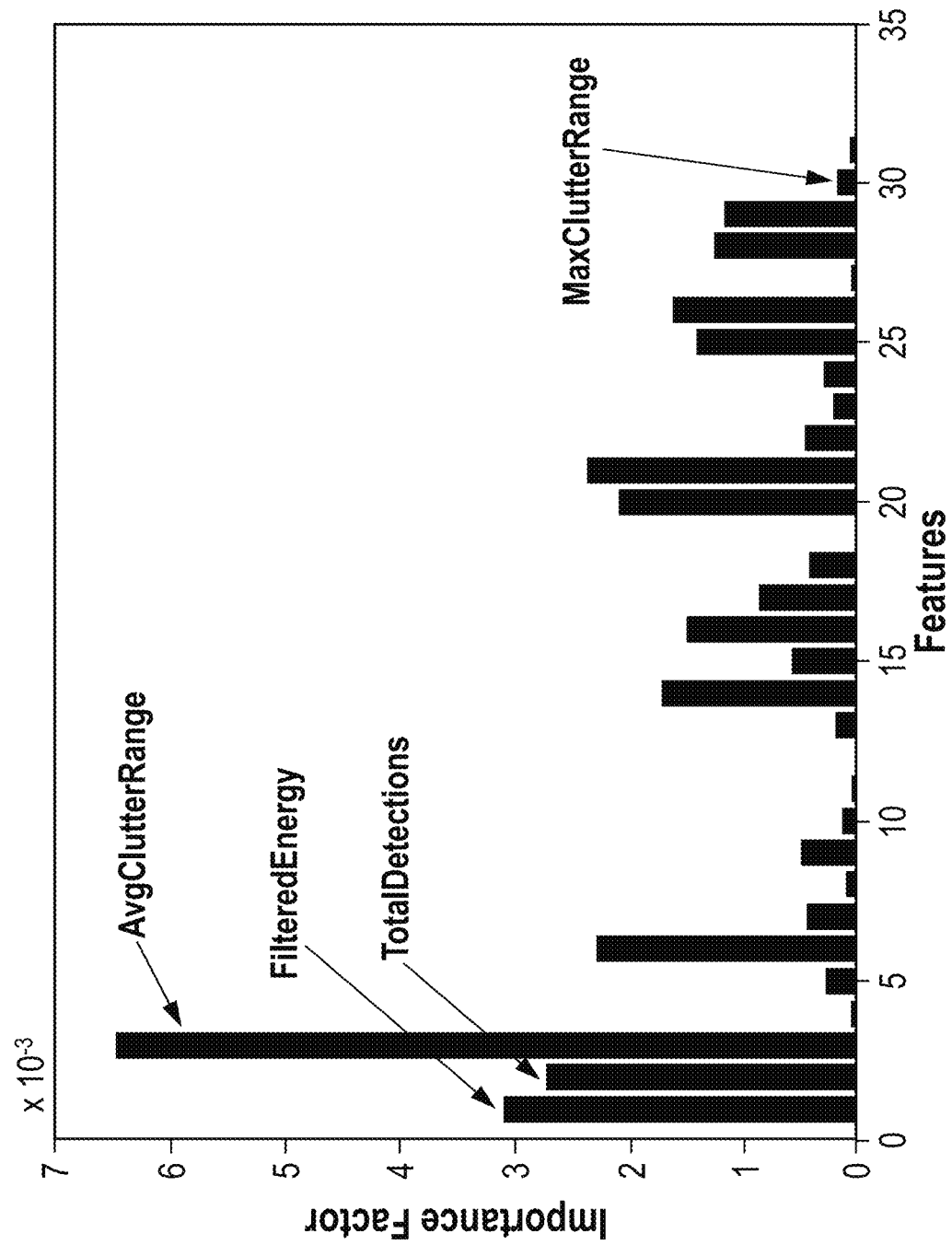
FIG. 5B includes a plot of the importance factor computed in accordance with the above description for each of the 31 potential feature variables selected during the first stage of feature selection using histograms and subjected to the second stage of feature selection using the bagged trees process, according to some exemplary embodiments.

FIG. 5A includes a list of the 31 feature variables selected during the first stage of feature selection using histograms and subjected to the second stage of feature selection using the bagged trees process, according to some exemplary embodiments. FIG. 5B includes a plot of the importance factor computed in accordance with the above description for each of the 31 feature variables selected during the first stage of feature selection using histograms and subjected to the second stage of feature selection using the bagged trees process, according to some exemplary embodiments. For clarity of description, a subset of the feature variables in FIG. 5A is as follows:

FilteredEnergy: the sum of the energy from all detections
TotalDetections: the total number of detections received
AvgClutterRange: the distance averaged over all detections
MaxClutterRange: the greatest detection distance
MinAngleErr_deg: the minimum angle error in the detections
AzimCorrCurve_deg: the angle correction applied to detection azimuth
Detect_Ang_rad: the average detection angle
EgoVel_mps: the host velocity in meters per second (mps)

Referring to FIG. 5B, the importance factor is plotted for each of the 31 feature variables. As illustrated in FIG. 5B, in some particular exemplary embodiments, three features were selected based on importance factor. Specifically, the three factors with the highest importance factors, namely, AvgClutterRange, FilteredEnergy, and TotalDetections, were selected. In addition, in the particular illustrated exemplary embodiments, MaxClutterRange was selected, even though it does not have a high importance factor. This selection was made based on human engineering judgment, which can be done with other features, since inclusion of a limited number of "useless" features, i.e., features with low importance factors, does not degrade overall system performance.

FIG. 5C includes a table which lists some of the feature variables processed by the two-stage feature selection process described in detail herein, as well as the disposition of each of the selected listed features, according to some exemplary embodiments. Referring to FIG. 5C, the MinAngleErr_deg, AzimCorrCurve_deg, Detect_and_rad, EgoVel_mps feature variables are all labeled as potentially accepted during the first-stage histogram analysis portion of the feature selection process, and then rejected following the second-stage Bagged Trees process. The FilteredEnergy, TotalDetections, MaxClutterRange, and AvgClutterRange feature variables are all labeled as potentially accepted during the first-stage histogram analysis portion of the feature selection process, and then selected following the second-stage Bagged Trees process.

Hence, as a result of this feature selection process, in these particular illustrative exemplary embodiments, the four most useful features for the blockage determination are selected. In one particular embodiment, the four feature variables are named as Filtered Energy, Average Clutter Range, Maximum Clutter Range, and Number of Detections. In summary, 31 potential features are identified as a result of the feature histogram analysis, and the bagged trees machine learning process is used to calculate each feature's importance in the blockage determination. In the illustrative exemplary embodiment described herein, four features are selected based on their behavior in both the histogram analysis and the bagged trees analysis. It should be noted that the feature selection can also be adjusted by users inserting their own judgment to determine features which do or do not belong in the final process. For example, features related to angular sensor alignment, such as AzimCorrCurve_deg, mentioned above, may not be included because they rely on blockage, and circular logic could result.

According to the present disclosure, using the feature selection process described above with histogram and bagged trees, multiple features are selected for use in the sensor blockage determination, based on their correlation with sensor blockage. In some exemplary embodiments, four features are selected, the four features being number of detections, total detection energy, maximum detection range and average detection range. Because these four features are so closely correlated with sensor blockage, according to the disclosure, during operation of the radar system, these four features are monitored, and their status or values are used to generate a blockage or non-blockage determination.

According to the present disclosure, a subset of the total number of features is selected/computed from detection data generated by the radar system. This subset of features is determined to be the features most closely correlated to sensor blockage and, therefore, the most useful features to be used in the blockage determination. As noted above, in some exemplary embodiments, this subset of features includes four features, namely, TotalDetections, FilteredEnergy, MaxClutterRange, and AvgClutterRange. Each detection has an associated magnitude, or power. By summing the power of all detections over one cycle, FilteredEnergy, or total detection energy, is obtained. Each detection has a range associated with it. The maximum range (MaxClutterRange) is the maximum range among all detections, in a single cycle. The average range (AvgClutterRange) is the average range of all detections, in a single cycle. In an alternative embodiment, the maximum range and average range could be computed over a time window, for example, of a duration of approximately 15 seconds.

After the features are identified as described above, the features are combined based on a machine learning approach, which is used to train a machine learning architecture to learn the relationship between the selected features and the blockage state. Any of several known machine learning architectures can be used, such as, for example, neural network, recurrent neural network, logistic regression, decision tree, bagged trees (random forest), and other such approaches. Under logistic regression, the machine learning architecture determines a method for combining the features into a logistic function. Essentially, this gives each feature a weight and an offset. By looking at the weight of each feature, its importance to the function can be observed. For example, if all features have equal weights, it can be observed that they are all equally important.

In summary of the approach of the disclosure using feature selection, according to these exemplary embodiments, all features derived from detections, tracks, and other sensor outputs, i.e., approximately 150 features, are plotted on histograms based on truth data, i.e., known sensor blockage state, to identify their importance to a sensor blockage determination. Based on this histogram analysis, a subset of features, e.g., 31 features, are identified as being potential features for final selection in the final classification process. Next, using machine learning, such as, for example, a Bagged Trees approach, in possible combination with human engineering judgment to include or exclude features, the final selected features, e.g., four features, are identified for used during subsequent classification of sensor blockage condition based on actual detections. As described above, a large set of data is acquired, under various blockage conditions, so that the "truth" data is known. Part of this data is used as training data, to determine the classifier parameters. The rest of the data can be used as test data, to verify the classifier performance. Different classifiers that were considered have different architectures. They all have the commonality that they can be specified by equations, and by a set of parameters, which are determined by the training described above.

Another machine learning technique used according to the present disclosure is tree bagging or "bagged trees." To describe tree bagging, first we review the decision tree. For example, we consider if blockage will be predicated on two normalized features, A and B, which could be, for exemplary illustration purposes, number of detections and maximum detection range. The first decision in the tree could be: Is A less than or greater than some threshold. If A is greater, go right on the tree, otherwise go left. Then the next decision could be, is B less than or greater than another threshold. Given a set of features, A and B, we can construct a decision tree. Decision trees can be computed by using the concept of information gain, such that for each node, the feature that can provide the most information is chosen as the decision variable. Using multiple decision trees has been found to give a better result than using any single decision tree. In tree bagging, each tree will be generated with a subset of the training data. Then the decision from many trees can be computed by using a voting algorithm over all of the trees.

According to the present disclosure, the Logistic Regression machine learning approach used for the blockage determination according to some exemplary embodiments is described in detail. The input to the algorithm is a set of independent variables $[x_1, x_2, \ldots, x_n]$ where n is arbitrary. In some particular exemplary embodiments, for the blockage algorithm, four independent variables are used. It will be understood that other numbers of independent variables can be used.

Optionally, not necessarily, each variable is normalized so that it ranges from 0 to 1. Consider the variable MaxClutterRange, which may range from 0 to 170 m, if the maximum sensor range is 170 m. It can be normalized by dividing by 170. Next, consider the variable AvgClutterRange, which typically ranges from 0 to 50 m. It can be normalized by dividing by 50. It is possible that AvgClutterRange may exceed 50 m, and in this case, the normalized variable can be set to 1 (it should not exceed 1). In some exemplary embodiments, the normalization parameters will be set manually by examining the variable ranges, and the parameters can be set so that they do not affect the output result. This normalization is not critical to the computation.

TABLE 1

| Feature | Definition | Normalization | Variable Name |
| --- | --- | --- | --- |
| FilteredEnergy | Sum of energy from all detections | Divide by 10,000 | $x_1$ |

TABLE 1-continued

| Feature | Definition | Normalization | Variable Name |
|---|---|---|---|
| NumberDetections | Number of detections | Divide by 60 | $x_2$ |
| AvgClutterRange | Average range, from all detections | Divide by 50 | $x_3$ |
| MaxClutterRange | The max range, out of all the detections | Divide by 170 | $x_4$ |

Table 1 lists the four selected feature variable names, their definitions, their normalization factors and their variable names used in the following computations. As shown in Table 1, the four selected input variables are renamed as the four variables $[x_1, x_2, \ldots, x_n]$, where each variable shall vary between 0 and 1. Table 2 shows typical values for the blocked and unblocked (clear) case. The normalization and renaming of variables can be considered pre-processing steps.

TABLE 2

Representative values for independent variables

| Example Case | $x_1$ | $x_2$ | $x_3$ | $x_4$ |
|---|---|---|---|---|
| BLOCKED | 4E−5 | 0.0017 | 0.0076 | 0.303 |
| CLEAR | 0.24 | 0.37 | 0.54 | 0.71 |

The equation for logistic model is given in (1).

$$P(x) = \frac{1}{1 + \exp(\beta_0 + \beta_1 x_1 + \beta_2 x_2 + \beta_3 x_3 + \beta_4 x_4)} \quad (1)$$

On the right side of (1), the four variables $x_1, \ldots x_4$ are the inputs to the model. The β parameters $\beta_0, \ldots \beta_4$. are what the machine learning will optimize. The probability P(x) is the probability that the sensor is blocked. If P(x)=1, then the sensor is definitely CLEAR. If P(x)=0, then the sensor is BLOCKED. If P(x)=0.5, a definite determination is not made.

In a more compact form, $$u = \beta_0 + \beta_1 x_1 + \beta_2 x_2 + \beta_3 x_3 + \beta_4 x_4 \quad (2)$$

$$P(x) = \frac{1}{1 + \exp(u)} \quad (3)$$

It can be observed that if $\beta_1=1$ and $x_1$ is large, then P(x)=0 because u will be large. This would correspond to the case where there are many detections and the sensor is clear. But if $x_1=0$, we can see that u will be small and then the probability could approach 1, indicating that there are few detections, and the sensor is blocked.

For further illustration, actual realistic numbers can be plugged into the algorithm. Several hours of drive data in the CLEAR and BLOCKED conditions, in different environs, were acquired. This gave us a table like Table 2, with tens of thousands of entries. We used 50% of the data for training and 50% for testing. Then the computer can find the optimal parameters $[\beta_0, \beta_1, \ldots \beta_5]$ such that the estimated CLEAR/BLOCK values will most closely match the true CLEAR/BLOCK values.

From our fit, we find that $$[\beta_0, \beta_1, \ldots, \beta_5] = [-5.69, 138.76, 3.92, 2.42, -0.26].$$

Because all x values are normalized, the magnitude of the coefficient may indicate the importance of the corresponding parameter. The coefficients indicate that the MaxClutterRange variable was less important than other variables. This is consistent with our initial finding that MaxClutterRange was not an important variable.

Initially, we will interpret P>0.5 as that the sensor is CLEAR and P<0.5 as that the sensor is BLOCKED We can apply (2) and (3) using the coefficients of (4). For the first row of Table 2, with $[x_1, x_2, \ldots, x_n]$=[4E-5,0.0017,0.0076, 0.303]. Then we compute a blockage probability P=0.0032, indicating that the sensor is BLOCKED. Next we try the second row of Table 2, with $[x_1, x_2, \ldots, x_n]$=[0.24,0.37, 0.54,0.71]. In this case the model gives P=1 indicating that the sensor is CLEAR. These results both gave the correct answer.

Figure 7A:
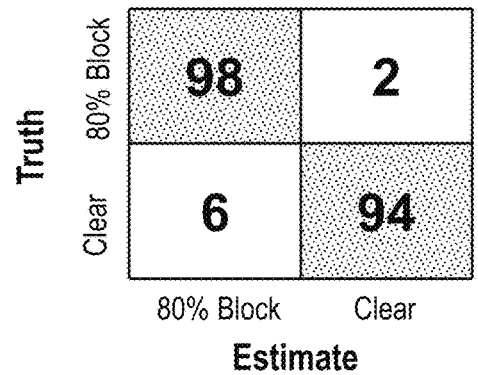
FIGS. 7A and 7B are confusion matrices related to applying the linear regression model to the test data set, wherein FIG. 7A reflects a probability threshold of 0.5, and FIG. 7B reflects a probability threshold of 0.15, according to some exemplary embodiments.
Figure 7B:
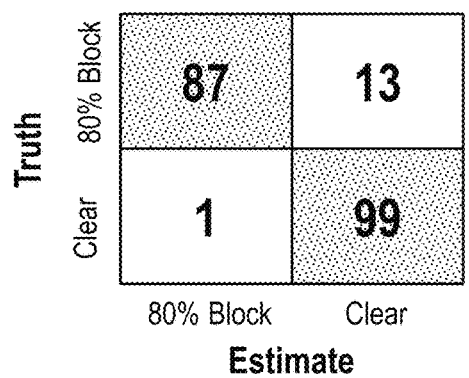

The model can be applied to the test dataset. FIGS. 7A and 7B are confusion matrices related to applying the linear regression model to the test data set, wherein FIG. 7A reflects a probability threshold of 0.5, and FIG. 7B reflects a probability threshold of 0.15, according to some exemplary embodiments. Ideally, the confusion matrix would be diagonal, with 1 on the diagonal and 0 on the off-diagonal. Referring to FIG. 7A, a false blockage rate less than 1%, but and FIG. 7A indicates that the false blockage rate is 6%. To adjust this result, the probability threshold at which it is declared that the probability indicates blockage can be changed. Referring to FIG. 7B, the confusion matrix when the probability threshold is changed to 0.15 is illustrated. In this case, if the probability exceeds 0.15, the sensor will be declared CLEAR. The false alarm rate is lower, but the probability of correctly declaring blockage has lowered to 87% which is still acceptable.

According to the present disclosure, a subset of the total number of features is selected/computed from detection data generated by the radar system. This subset of features is determined to be the features most closely correlated to sensor blockage and, therefore, the most useful features to be used in the blockage determination. As noted above, in some exemplary embodiments, this subset of features includes four features, namely, number of detections, total detection energy, maximum detection range and average detection range. Once the features are selected, in some exemplary embodiments, a machine learning architecture is trained to learn the relationship between the features and the blockage state. In another approach, instead of performing feature selection to identify the optimal subset of useful features, all of the detections for each cycle are input to a machine learning process/architecture. In either case, the machine learning architecture can be any of a neural network architecture, a recurrent neural network architecture, a logistical regression architecture, a decision tree architecture or a bagged trees (random forest) architecture. In the case of the former approach, in which the selected subset of potential features is used, in one particular exemplary embodiment, logistical regression is used. In the latter case, in which all detections are processed without performing feature selection, in one particular embodiment, neural network machine learning is used. It will be understood that any machine learning approach can be applied to either technique.

Figure 6:
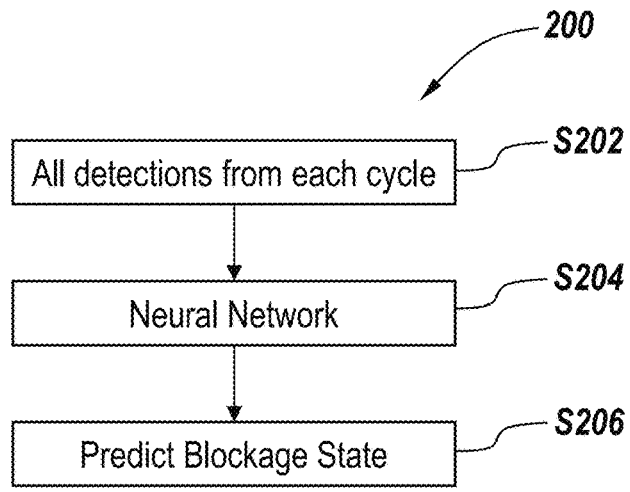
FIG. 6 includes a logical flow diagram illustrating steps in an alternative process for radar sensor blockage detection, according to some exemplary embodiments.

As noted above, in an alternative approach, instead of performing feature selection to identify a subset of useful features, all of the detections for each cycle are input to a machine learning process/architecture. FIG. 6 includes a logical flow diagram illustrating steps in an alternative process 200 for radar sensor blockage detection, according to some exemplary embodiments. Referring to FIG. 6, in step S202, all detections are generated for a single radar cycle. Next, in step S204, all of the detections are applied to a machine learning architecture, such as a neural network. The network itself may compute features associated with the detections, such as average range, etc. The network may use a recursive structure (RNN) to retain data from previous cycles. Based on the detections used in training the neural network, the blockage state of a sensor can be determined in step S206.

With regard to the neural networks approach identified in FIG. 6, in some exemplary embodiments, the neural network includes layers of nodes. Each node is connected to every node in the previous layer, in the case of a fully connected network. The connection specifies a weight. The input to each node is the sum of the contributions from each node from the previous layer, multiplied by the specified weight. Then, the input will be run through a non-linearity, often using the logistic function for the response curve. Deep learning refers to using more than two layers in the neural network, which has been shown to significantly improve the performance of such networks.

As noted above, with reference to FIG. 6, using the neural networks approach, instead of the input to the classifier being a set of four selected features, all of the detection information is entered into the classifier. This could potentially allow the classifier to make a more accurate decision than by using only the limited selected feature information. The detection information is internally stored as a list of detections, with each detection containing information about the detection position, velocity, and magnitude, and possibly additional parameters. In some exemplary embodiments, the detection list is reformatted into an image, or occupancy grid. Using an image instead of a detection list allows the use of neural network layers such as the convolutional layer, which is designed for images.

According to some exemplary embodiments, the image is designed to have three layers. In the first layer, we have a grid of size 40×40, where each grid cell represents a spatial region of length 4 meters on a side. Then, in each grid cell we enter the number of detections in that spatial region, during the 15-second window. On the second layer, we sum the energy over the spatial region, during the 15-second window. Finally, on the third layer, we include the values of four features used in the feature-based classifier described above in detail. By setting the central values of an image to the four values, we could input the values as part of an image, which made it easier to use in the neural network. Representative images are shown in FIG. 6.

The neural network architecture according to some exemplary embodiments is shown in Table 3. It starts with a convolutional network and then a fully connected network. Dropout layers are used to prevent overfitting. The layers indicated by N can vary depending on whether we try to classify N=3 or N=2 levels of blockage. The neural network of Table 4 has 50,000 fit parameters, which is significantly more than the logistic model or the bagged tree model. It is preferable to use the minimal number of fit parameters for simplicity, to reduce memory usage, and to minimize the risk of overfitting.

TABLE 3

Neural Network Layers.

| Layer | Description | Size | Number weights |
|---|---|---|---|
| imageInputLayer | Input | 40 × 40 × 3 | |
| Conv1, Relu, Dropout | Convolution | 40 × 1 × 10 | 1200 |
| FC1, Relu, Dropout | Fully connected | 1 × 1 × 128 | 51200 |
| FC2, Relu, Dropout | Fully Connected | 1 × 1 × N | 128*N |
| Softmax, classifiedOutput | output | 1 | |

Whereas many alterations and modifications of the disclosure will become apparent to a person of ordinary skill in the art after having read the foregoing description, it is to be understood that the particular embodiments shown and described by way of illustration are in no way intended to be considered limiting. Further, the subject matter has been described with reference to particular embodiments, but variations within the spirit and scope of the disclosure will occur to those skilled in the art. It is noted that the foregoing examples have been provided merely for the purpose of explanation and are in no way to be construed as limiting of the present disclosure.

While the present inventive concept has been particularly shown and described with reference to exemplary embodiments thereof, it will be understood by those of ordinary skill in the art that various changes in form and details may be made therein without departing from the spirit and scope of the present inventive concept as defined by the following claims.

The invention claimed is:

1. A radar sensor, comprising:
   a memory storing a model defining a relationship between a condition of the radar sensor and a plurality of features of radar detections, the model being generated by a machine learning approach in which, during a training operation, a plurality of training radar detections are received under known states of the condition of the radar sensor, the model storing values of the plurality of features associated with the known states of the condition of the radar sensor;
   a radar detector for transmitting radar signals into a region, detecting reflected returning radar signals from the region, and converting the reflected returning radar signals into digital data signals; and
   a processor for receiving the digital data signals and processing the digital data signals to generate actual radar detections, each of the actual radar detections being characterized by a plurality of the features of radar detections, the processor applying values of the features of the actual radar detections to the model to determine the state of the condition of the radar sensor from the values of the features of the actual radar detections; wherein:
   the model identifies a subset of features associated with the training radar detections which are useful in determining the state of the condition of the radar sensor, wherein the subset of features is identified using analysis of histograms of features associated with the training radar detections; and
   the processor applies the identified features of the actual radar detections to the model to determine the state of the condition of the radar sensor.

2. The radar system of claim 1, wherein the radar system is an automotive radar system.

3. The radar sensor of claim 1, wherein the condition of the radar sensor is blockage of the radar sensor.

4. The radar system of claim 1, wherein the machine learning approach comprises a neural network approach.

5. The radar system of claim 1, wherein the machine learning approach comprises a logistic regression approach.

6. The radar system of claim 1, wherein the machine learning approach comprises a bagged trees approach.

7. The radar system of claim 1, wherein the subset of features is selected using a Bagged Trees analysis of features associated with the training radar detections.

8. A method for detecting a condition of a radar sensor, comprising:
- storing in a memory a model defining a relationship between the condition of the radar sensor and a plurality of features of radar detections, the model being generated by a machine learning approach in which, during a training operation, a plurality of training radar detections are received under known states of the condition of the radar sensor, the model storing values of the plurality of features associated with the known states of the condition of the radar sensor;
- transmitting radar signals into a region;
- detecting reflected returning radar signals from the region;
- converting the reflected returning radar signals into digital data signals;
- receiving the digital data signals with a processor; and
- processing the digital data signals with the processor to generate actual radar detections, each of the actual radar detections being characterized by a plurality of the features of radar detections, the processor applying values of the features of the actual radar detections to the model to determine the state of the condition of the radar sensor from the values of the features of the actual radar detections; wherein:

the model identifies a subset of features associated with the training radar detections which are useful in determining the state of the condition of the radar sensor, wherein the subset of features is identified using analysis of histograms of features associated with the training radar detections; and
- the processor applies the identified features of the actual radar detections to the model to determine the state of the condition of the radar sensor.

9. The method of claim 8, wherein the radar sensor is an automotive radar sensor.

10. The method of claim 8, wherein the condition of the radar sensor is blockage of the radar sensor.

11. The method of claim 8, wherein the machine learning approach comprises a neural network approach.

12. The method of claim 8, wherein the machine learning approach comprises a logistic regression approach.

13. The method of claim 8, wherein the machine learning approach comprises a bagged trees approach.

14. The method of claim 8, wherein the subset of features is selected using a bagged trees analysis of features associated with the training radar detections.

\* \* \* \* \*